United States Patent
Helfrich

[11] 3,914,020
[45] Oct. 21, 1975

[54] ELECTRO-OPTICAL CELL
[75] Inventor: Wolfgang Helfrich, Magden, Switzerland
[73] Assignee: Hoffmann-La Roche Inc., Nutley, N.J.
[22] Filed: Oct. 31, 1974
[21] Appl. No.: 519,581

[30] Foreign Application Priority Data
Nov. 2, 1973   Switzerland.................. 15449/73

[52] U.S. Cl............................. 350/160 LC; 350/150
[51] Int. Cl.² .......................................... G02F 1/13
[58] Field of Search.................. 350/160 LC, 150

[56] References Cited
OTHER PUBLICATIONS
Steinstrasser et al., Agnew. Chem. Internat. Edit. Vol. 12, No. 8, 1973, pp. 622–623, 629.
Wagner, IBM Technical Disclosure Bulletin, Vol. 13, No. 10, Mar., 1971, p. 2961.

Primary Examiner—Robert J. Webster
Attorney, Agent, or Firm—Samuel L. Welt; Bernard S. Leon

[57] ABSTRACT

An electro-optical cell having two transparent plates with a liquid crystal material having a dielectric anisotropy of about zero disposed between the plates, the surfaces of the plates exerting an orientation effect on the molecules of the liquid crystal material, the orientating effect being substantially greater at one of said surfaces than at the other.

5 Claims, 4 Drawing Figures

ELECTRO-OPTICAL CELL

DETAILED DESCRIPTION OF THE INVENTION

Figure 1:
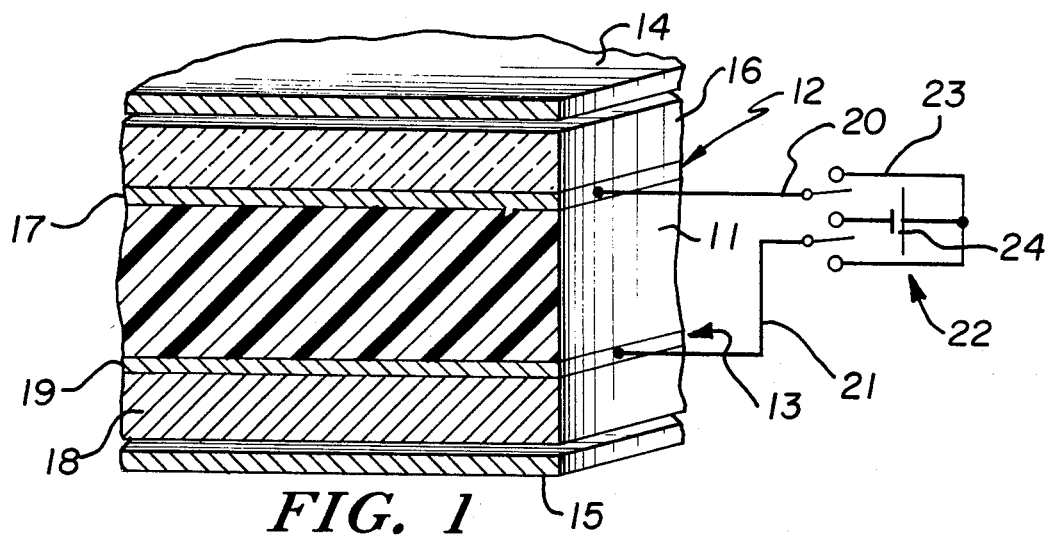

The invention concerns an electro-optical cell with a nematic liquid crystal material arranged between two transparent plates provided with electrodes.

A large number of electro-optical cells are known, in which the modulation of the transmitted light is brought about with the aid of electric fields or currents utilizing various effects occurring in nematic liquid crystals. Some examples of such effects are dynamic scattering, the so-called "guest-host interaction," the deformation effect of homeotropic (DAP effect), homogeneous and twisted homogeneous nematic layers, etc. The individual effects differ from one another with respect to the threshold potentials, the producible contrasts, the switching rate and other criteria. Common to all prior art effects are long switching times. In particular, a relatively long switch-off time is required in which, after switch-off of the electric field, the molecules of the liquid crystal reoccupy the configuration which they held before switch-on of the field. This is attributable to the fact that these effects are independent of the polarity of the electric field applied. A result of this is, for example, that they can be operated with alternating current. Accordingly, there is no possibility of actively switching the liquid crystal back into the unmodulated state. The active switching-back, according to present knowledge in this field, appears to be the only method of substantially shortening the switch-off time.

The object of the invention more fully described hereinafter is to provide the art with an electro-optical cell, which has a considerably shorter switch-off time than known optical-cells utilizing liquid crystal material.

This objective is achieved in accordance with the optical cell described herein by having it comprise a nematic liquid crystal material with a dielectric anisotropy about equal to zero, said liquid crystal material possessing a homeotropic texture in the field-free state, orientating the surfaces of the plates which face the molecules of the liquid crystal material such that the long axis of the molecules are about perpendicular to the plate surfaces with orientational forces of differing strengths and providing one polarizer in front of and one behind the liquid crystal in crossed arrangement in the direction of the transmitted light.

Figure 2:
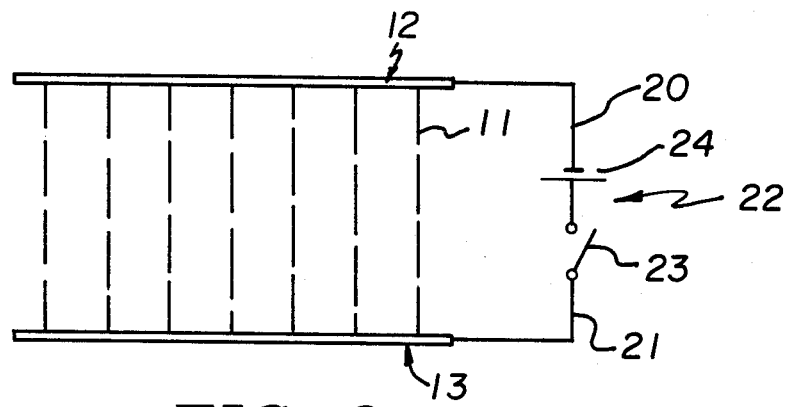
Figure 3:
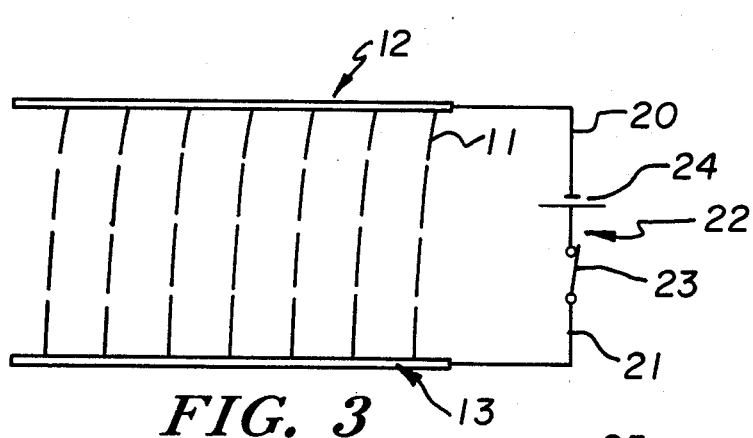
Figure 4:
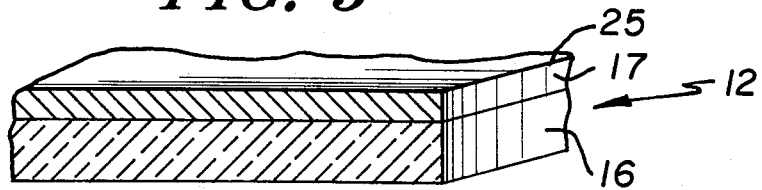

The invention is described in the following by way of the accompanying drawings. In the drawings, there are shown in:

FIG. 1, a cross-section through a part of a cell according to the invention,

FIG. 2, a schematic representation of the same section with drawn-in orientation lines in the field-free state, FIG. 3, a corresponding representation of FIG. 2 with applied field, FIG. 4, a section of the lower plate of the arrangement shown in FIG. 1, with an additional layer covering the electrode.

FIG. 1 shows on a greatly enlarged scale, a section of an electro-optical cell according to one embodiment of the invention. The cell consists essentially of a liquid crystal material 11 which is arranged between two plates 12 and 13. Polarizers 14 and 15 are positioned on each side of this arrangement or, as in the representation in FIG. 1, below and above same.

The liquid crystal 11 consists essentially of a nematic liquid crystal material whose dielectric anisotropy is equal to or is approximately equal to zero. Moreover, the molecules of the liquid crystal possess a permanent electric dipole moment and an asymmetric form, which is, for example, conical or banana-like. The liquid material suitable for the present invention contains molecules, the curvo-electric constants $e_{11}$ of the longitudinal bending and $e_{33}$ of the transverse bending of which are of differing size. It is advantageous if the difference $e_{11}-e_{33}$ is as large as possible. In other words, substances which show to a large degree the known piezoelectric effect of liquid crystals are particularly useful. With the deformation of such a liquid crystalline material, a polarization results or, vice versa, an electric field produces a splaying or bending of the orientation lines of the liquid crystal material.

A substance which shows this effect and with which, accordingly, an electro-optical cell according to the invention may be constructed, is p-methoxybenzylidene-p,n-butylaniline (MBBA). In order to achieve a dielectric anisotropy of approximately zero, a slight amount, for example 1%, of n-(4-ethoxybenzylidene)-4-aminobenzonitrile (PEBAB) can be admixed with the MBBA. Of course, it should be understood that other nematic liquid crystal substances, including mixtures of various components can be efficaciously utilized. A suitable composition consists e.g. of p,p'-di-n-butylazoxybenzole and p-methoxy-p'-n-butylazoxybenzole, preferably in a ratio of 60 to 40, which has a dielectric anisotropy of $\Delta_\epsilon = + 0.04$.

All that is required is that the substance be nematic, the difference between the $e_{11}$ and $e_{33}$ values be preferably large and the dielectric anisotropy of the material utilized be about zero.

The requirement that the dielectric anisotropy should be equal to or approximately equal to zero exists, then, if a pure curvo-electronic effect is desired. If this requirement is not fulfilled, a super-imposition of the curvoelectronic effect with a dielectric effect results, which may be undesirable for certain applications.

The liquid crystal material 11 possesses a nearly homeotropic texture i.e. its molecules are all aligned approximately parallel with the longitudinal axis of the molecules being essentially perpendicular to the two plates 12 and 13. This texture is achieved by the surface quality of the plates 12 and 13 as described in the following. By the surface quality there is meant the binding forces exerted by the surface of the plates on the molecules of the liquid crystal material.

The plate 12 consists of a transparent glass plate 16 such as is commonly used for the manufacture of known electro-optical cells. On its surface facing the liquid crystal, the glass plate 16 possesses a transparent, conducting layer 17, which is denoted hereinafter as electrode 17. Electrode 17 may be made of $SnO_2$, $InO_2$ or any other substance which is commonly used for the manufacture of such transparent electrode layers. Depending on the use of the present electro-optical cell, the electrode 17 can either continuously cover the entire surface of the glass plate 16 to provide a light valve or the electrode 17 can be divided into separated areas like a raster to produce individual image points, or into certain figures such as are required, for example, to produce alphanumeric characters in accordance with conventional procedures.

The surface of electrode 17 of plate 12 facing the liquid crystal is treated such that the molecules of the liquid crystal are orientated at an angle of about 90° to the plate surface, the orientational force being relatively large at electrode 17. In other words, the fixing of the molecules of the liquid crystal material at an angle of 90° is relatively rigid. Such as orientating action is achieved, for example, by etching the surface of the electrode 17. Another possibility for achieving the relatively rigid orientation is described in the following in connection with FIG. 4.

The plate 13 likewise consists of a glass plate 18 whose surface facing the liquid crystal material 11 is provided with an electrically conducting layer or electrode 19. As in the opposite plate, the electrically conducting layer or electrode 19 can either uniformly cover the glass plate 18 or be split into individual regions like a raster or other design.

The surface of the electrically conducting layer or electrode 19 facing the liquid crystal material 11 is treated so that the molecules of the liquid crystal material 11 likewise adjust themselves approximately perpendicularly to the plate surface, the orientational forces exerted on the liquid crystal material molecules being, however, substantially smaller on this side at electrode 19 than on the opposite side at electrode 17. Such an orientating action with a relatively weaker orientational force can be obtained, for example, by treating the surface of plate 13 facing material 11 with an alcoholic (e.g., ethanolic) lecithin solution although other similar type materials can be used.

By orienting the molecules of the liquid crystal material approximately perpendicular to the plate surfaces, the liquid crystal material possesses a homeotropic texture. As already stated, the orientational forces on the two plate surfaces which exert an orientation effect on the molecules are of different magnitudes. It is especially advantageous when this difference is relatively large. Because of this factor, the more commonly used method for archieving a homeotropic texture by doping liquid crystal material, for example, with polyamide resins, is prohibited and should not be used because its action is of equal magnitude throughout the entire liquid crystal material.

The two plates are separated by spacers commonly employed in the construction for electro-optical cells, for example, by a distance of $20\mu$. On the lateral edges, the cell is hermetically sealed in accordance with conventional procedures, for example, with glass solder or with a synthetic material (epoxy and the like).

The electrically conducting layers or electrodes 17 and 19 are connected via lines 20 and 21 with a control circuit 22, which is represented merely symbolically in FIG. 1 by a switch 23 and a voltage source 24, whereby with the aid of the switch 23, the applied voltage can be not only switched on and off, but its polarity can also be reversed.

It is obvious that in reality, the circuit 22 represents an intrinsically comprehensive control circuit, especially if the electrodes are split into individual separated areas which are controlled independently of one another. With separated areas, it is obvious that instead of the lines 20 and 21, a number of lines to the individual electrode segments are present in accordance with usual practices. Such is not illustrated in the drawing, but should be readily visible by those skilled in the art.

The polarizers 14 and 15 are arranged parallel to the plates 12 and 13 such that their polarization directions are perpendicular to one another and form an angle of 45° with the planes in which the orientation lines of the liquid crystal lie with an applied field. How these planes or orientation lines lie with an applied field becomes evident from the subsequent description of the function of the cell. As polarizers, there can be utilized polarization foils, etc., as are commonly used for electro-optical cells.

The working of the cell is elucidated by way of FIGS. 2 and 3. FIG. 2 shows, again in greatly simplified representation, the liquid crystal material 11 (of which only the orientation lines are given here) lying between the plates 12 and 13. The electrodes of the plates 12 and 13 are connected with the voltage source 24 via the lines 20 and 21 and the switch 23. The switch 23 is seen opened in FIG. 1 so that in the open position no voltage is applied to the electrodes. Accordingly, the liquid crystal is only influenced by the orientational forces at the two plate surfaces and has a homeotropic texture. The orientation lines of the liquid crystal material molecules along the longitudinal axis thereof, are parallel to each other and essentially perpendicular to the plates 12 and 13.

If, as shown in FIG. 3, the switch is closed, a potential lies between the electrodes of the plates 12 and 13 and a homogeneous electric field is produced in the liquid crystal material 11. This electric field acts on molecules which are not precisely parallel to the field or aligned perpendicular to the plates. Such deviations from the exactly perpendicular direction are also produced with a homeotropic texture because of static fluctuations, so that there are always molecules present which form a small angle with the field direction. Because of the curvoelectronic effect, the homeotropic texture of the liquid crystal is bent, as is shown by the curved orientation lines in FIG. 3. The bending is effected in the direction in which, statistically speaking at the switch-on of the field, the predominant number of molecules deviate from the exactly perpendicular direction. Such a deviation from the exact symmetry exists practically always in cells of this type because, in the manufacture of the plates, deviations from the symmetry cannot be avoided. It is advantageous, however, to purposely provide such deviations from the symmetry.

Polarized light irradiated perpendicular to the plates 12 and 13 passes through the liquid crystal material 11 unmodulated in the field-free state shown in FIG. 2, because it proceeds parallel to the optical axis of the liquid crystal. Light which is linearly polarized by the polarizer 15 is accordingly blocked by the opposite polarizer 14 whose polarization direction is perpendicular to the polarizer 15 and hence is not transmitted. In the case of the applied electric field shown in FIG. 3 in which the orientation lines are bent, the light irradiated perpendicular to the plate 13 no longer proceeds in the direction of the optical axis, since this is given by the orientation lines, and is accordingly depolarized. After passage through the liquid crystal, the light possesses a component in the direction of the polarization direction of the polarizer 14 and can pass through this. For an observer situated on the side of the polarizer 14, the cell accordingly seems dark in the field-free state, and light with an applied field.

With switch-off, i.e., no electric field applied, the homeotropic structure of the liquid crystal readjusts itself, i.e., the light again passes through the liquid crystal unmodulated and the cell seems dark to the observer. Now, however, since there is concerned an effect which is dependent on the field direction, the polarity of the field can be reversed instead of switched off. In this way, the bending of the homeotropic texture is actively switched back. Herein lies the great advantage of the present cell since, by the active switchback, the switchoff time of the electrooptical effect can be greatly shortened.

As already mentioned, it is advantageous if a weak deviation from the strict homeotropic texture is procured for the molecules of the liquid crystal by the surface structure of the plates 12 and 13 or one of these two plates. Even a deviation of the symmetry of the static fluctuations is sufficient since, with a weakly specified preferential direction, the orientating action amplifies itself with switch-on of the field. Apart from the structure of the plate surfaces, such a preferential orientation can also be effected by an additional electric or magnetic field running parallel to the plates. In order to apply an additional electric field, there are provided, for example, suitable electrodes on the edges of the cell. Since a weak deviation from the symmetry suffices, a very weak additional field is adequate.

By the curved orientation lines, there are defined planes standing perpendicular to the plates, which can be denoted as major sectional planes. The polarization directions of the polarizers 14 and 15 should form an angle of 45° with these major sectional planes. With this alignment of the polarizers, the contrast between light and dark is the strongest.

In FIG. 4 is shown an alternate possibility with which the rigid orientation of the plate 12 can be achieved. Over the electrode 17 is present a molecular layer 25 of silanes which are applied in solution. More particularly, a uniform layer of a silane, for example, N-methyl-amino-propyltrimethyoxysilane may be obtained by dissolving the designated silane in an appropriate aqueous organic solvent and dipping the plate 12 in the solvent, rinsing off the excess solvent with deionized water and drying (curing) the layer. In accordance with this procedure there is produced a stable cross-linked two dimensional polymer network. These silanes possess a dipole moment which orientates the adjacent molecules of the liquid crystal perpendicular to the surface. Another suitable material is e.g. the alcoxysilane material n,n-dimethyl-n-octadecyl-3-aminopropyl-trimethoxy-silylchloride (DMOAP), with which the molecules orient themselves slightly inclined to the plate surface. The one molecular layer is not sufficiently homogeneous to act as an insulator. As a result, the danger does not exist that it is polarized with an applied field and the entire potential between the two plates 12 and 13 falls off this layer.

The weaker oriented fixation at the opposite side may be achieved e.g. by etching the plate surface. A treatment of the opposite surface may, however not be necessary because the orienting effect of one side is sufficient.

As already mentioned, the great advantage of the present electro-optical cell exists in that it can be actively switched back and that the switch-off time is substantially shorter than in other electro-optical cells. By this means, the present cell is especially suited for applications in which short switching times are required such as, for example, in teleview technology, etc.

I claim:

1. An electro-optical cell comprising a nematic liquid crystal means sandwiched between two transparent plate means, each of said plate means including an electrode means, the surface of each plate means facing the liquid crystal means being treated so as to possess an orienting force which causes the molecules of the liquid crystal means to orient themselves directionally at the facing surface of each plate, the orienting force at one surface being substantially smaller in magnitude than the orienting force at the other surface, said molecules being disposed parallel with each other, with the long axis thereof being approximately perpendicular to the surfaces which exert an orienting effect on the molecules, said liquid crystal means having a dielectric anisotropy of about zero and having a substantially homeotropic texture in the absence of an electric field, polarizing means, one disposed in front of and one behind the liquid crystal means in a crossed arrangement and in the direction of transmitted light.

2. An electro-optical cell in accordance with claim 1 in which the weaker of the orienting forces on the surface of one of the plate means is provided by treating said surface with an alcoholic lecithin solution.

3. An electro-optical cell in accordance with claim 2 in which the surface exerting the greater orienting effect on the molecules of the liquid crystal means is etched.

4. An electro-optical cell in accordance with claim 1 in which the surface of the plate means which exerts the greater orienting effect on the molecules of the liquid crystal means has a layer of silanes disposed thereon.

5. An electro-optical cell in accordance with claim 1 in which the polarizing directions of the polarizing means forms an angle of 45° with the planes in which the longitudinal axis of the molecules of the liquid crystal means lie when an electric field is applied between the two plates.

* * * * *